United States Patent
Morales et al.

(10) Patent No.: US 8,200,023 B2
(45) Date of Patent: Jun. 12, 2012

(54) METHOD AND SYSTEM FOR PROCESSING PHOTO PRODUCT TEMPLATES

(75) Inventors: Javier A. Morales, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 851 days.

(21) Appl. No.: 12/333,788

(22) Filed: Dec. 12, 2008

(65) Prior Publication Data

US 2010/0150437 A1  Jun. 17, 2010

(51) Int. Cl.
G06K 9/62 (2006.01)
G06K 9/00 (2006.01)
G06K 9/34 (2006.01)

(52) U.S. Cl. .................. 382/209; 382/167

(58) Field of Classification Search .......... 382/162–167, 382/181, 203, 209, 254, 276, 296; 348/207.1, 348/239, 240.99, E5.024; 345/589, 590, 345/600; 358/1.9, 1.14, 1.18, 515, 518; 715/243, 715/765

See application file for complete search history.

(56) References Cited

U.S. PATENT DOCUMENTS

| | | | | |
|---|---|---|---|---|
| 6,072,588 | A * | 6/2000 | Dohnomae | 358/1.9 |
| 7,385,724 | B2 * | 6/2008 | Brown | 358/1.18 |
| 7,437,019 | B2 * | 10/2008 | Kita et al. | 382/296 |
| 7,769,232 | B2 * | 8/2010 | Downs, III | 382/181 |
| 2009/0153703 | A1 * | 6/2009 | Wang | 348/239 |
| 2010/0150437 | A1 * | 6/2010 | Morales et al. | 382/167 |
| 2010/0220197 | A1 * | 9/2010 | Dukellis et al. | 348/207.1 |
| 2011/0280476 | A1 * | 11/2011 | Berger et al. | 382/163 |

* cited by examiner

*Primary Examiner* — Amir Alavi

(74) *Attorney, Agent, or Firm* — Kermit D. Lopez; Luis M. Ortiz; Ortiz & Lopez, PLLC

(57) ABSTRACT

A system and method for processing digital photo product templates to enhance a personalized photo product and to enable greater flexibility when selecting options for the photo product template. One or more photo product templates can be defined as a series of objects, some of which are capable of being colorized by a user. Color sets applicable to the photo product template can be displayed based on a predefined set of colors and/or a user-defined "seed color". The selected color sets can be automatically applied to the photo product template utilizing a predefined rank. The color sets can be ranked and complementary color set suggestions provided based on the evaluation of the colors in an image.

20 Claims, 4 Drawing Sheets

METHOD AND SYSTEM FOR PROCESSING PHOTO PRODUCT TEMPLATES

TECHNICAL FIELD

Embodiments are generally related to image processing systems and methods. Embodiments also relate in general to the field of computers and similar technologies and in particular to software utilized in this field. Embodiments are additionally related to methods and systems for processing digital photo product templates.

BACKGROUND OF THE INVENTION

Digital images generated by, for example, digital cameras or scanned photographic film, are capable of being uploaded to a web site for online photo sharing. For example, such images may be stored in online albums for sharing with others. A group of these digital images can be viewed and selected for printing utilizing a web browser. A user may select the size of each print to be produced and the quantity of prints to be generated from each image.

Some photo sharing applications offer a variety of photo product templates with place holders for customer-supplied images. The majority of prior art photo product template processing systems provide a variety of template styles (i.e., typically of low resolution) to a customer via a home computer or, for example, a photo kiosk. Such templates possess pre-existing images and/or text thereon with one or more open fields for the addition of customer image and/or text data therein for customizing the template into a finished print. These types of templates can act as a mask that is capable of being placed over one or more images and typically include selections of essentially the same template in different colors. Such prior art template processing systems lack the ability to allow the customer to make any modifications they desire. For example, a customer may wish to use different color set to the template at various locations and orientations before customizing the photo product. However, existing template processing systems cannot accept any modifications beyond the pre-existing image and data fields in their specified locations on the template. Also, such prior art designs can act as a barrier to rapid document selection for a print shop's customer, while also restricting choice for modifications.

Based on the foregoing, a need exists for an improved system and method for processing digital photo product template. A need also exists for providing enhancements to personalized photo product to enable greater flexibility when selecting options for the photo product template.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved image processing method, system and computer-usable medium.

It is another aspect of the present invention to provide for an improved method and system for processing digital photo product templates.

It is a further aspect of the present invention to provide for an improved method for providing enhancements to personalized photo product to enable greater flexibility when selecting options for the photo product template.

The aforementioned aspects and other objectives and advantages can now be achieved as described herein. A system and method for processing digital image templates to enhance a personalized photo product and to enable greater flexibility when selecting options for the photo product template is disclosed. The photo product templates can be defined as a series of objects some of which can be colorized. Color sets that can be applied to the photo product template can be displayed based on a predefined set of colors and/or a predefined (e.g., user defined) "seed color". The selected color sets can be automatically applied to the template utilizing a predefined rank. The color sets can be ranked and complementary color set suggestions can be provided based on the evaluation of the colors in an image. Also, the color set associated with the photo product template can be rotated and the colors in the color set can be collapsed.

Initially, a template can be selected from one or more of a series of predefined templates. A unique number of colors defined in the template can be determined and a number of color sets that can be applied to the template can be displayed. The color sets can be determined utilizing an available set of color sets predefined (e.g., by a print shop) and/or based on a pre-defined "seed color" which can then be utilized to search for and identify additional colors. The disclosed method and system can be implemented to evaluate the image(s) in the template to determine seeds for color set definition. The colors within the color set can be defined in a ranked order utilizing an algorithm that evaluates relative placement in, for example, a color wheel. Finally, the list of color sets can be utilized to customize a photo product by automatically applying colors in a pre-selected (e.g., user selected) color set to the template utilizing the predefined rank.

The colors in the color set can be rotated in order to override the ranking of the colors in the color set by changing a top-ranked color into a lowest ranked color. The number of colors in the set can also be collapsed in order to create a smaller color set utilizing the same seed. Such an approach reduces the number of discrete designs that must be maintained while offering greater color choices and provides a virtually infinite number of templates and eliminates duplication. The rules-based association between the color sets and the templates eliminates a lot of the work involved in providing variations of a template. The system also provides more flexibility for print shop customers to customize photo products to their liking while providing real time design assistance.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
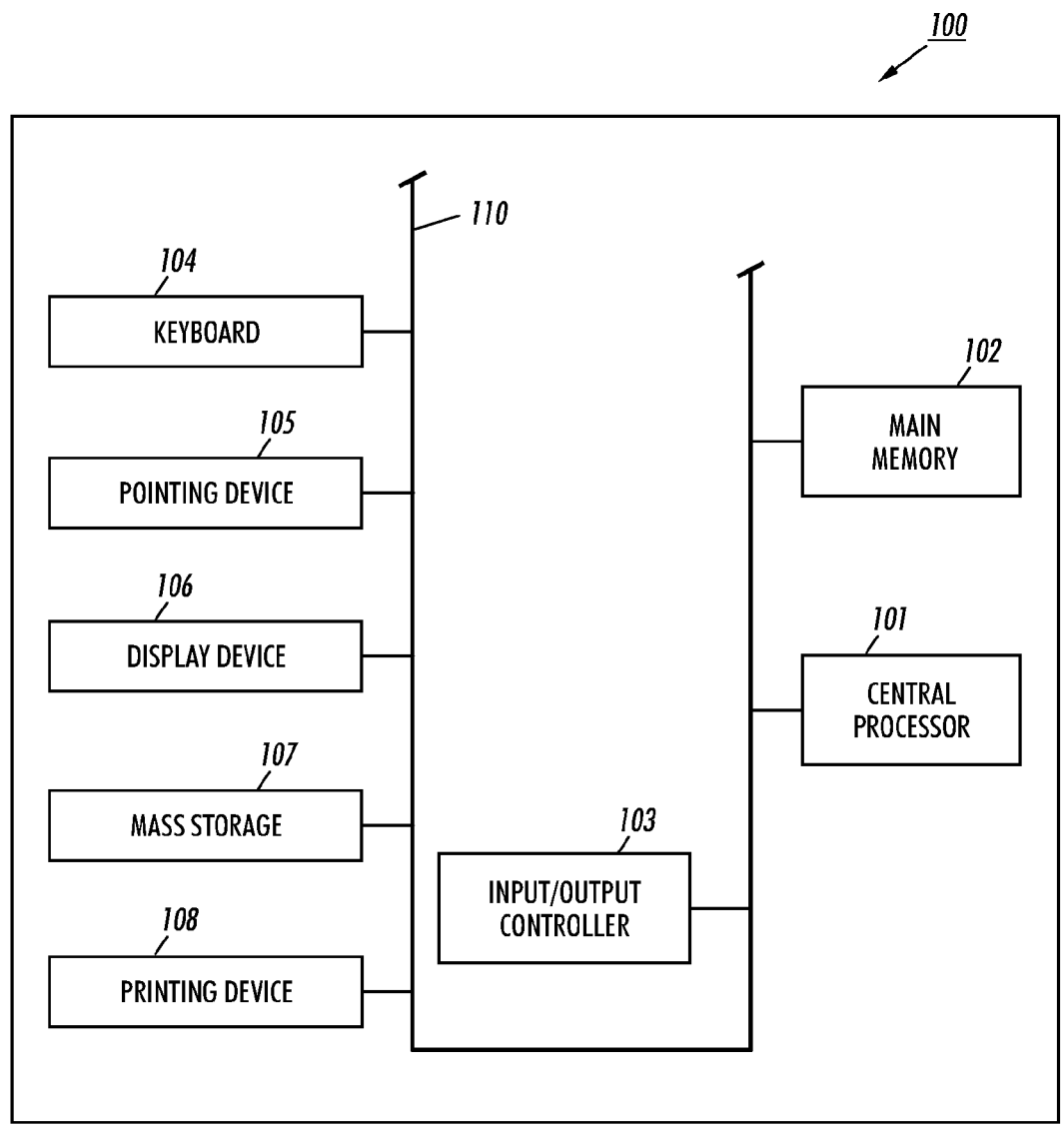
FIG. 1 illustrates a schematic view of a computer system in which the present invention may be embodied.
Figure 2:
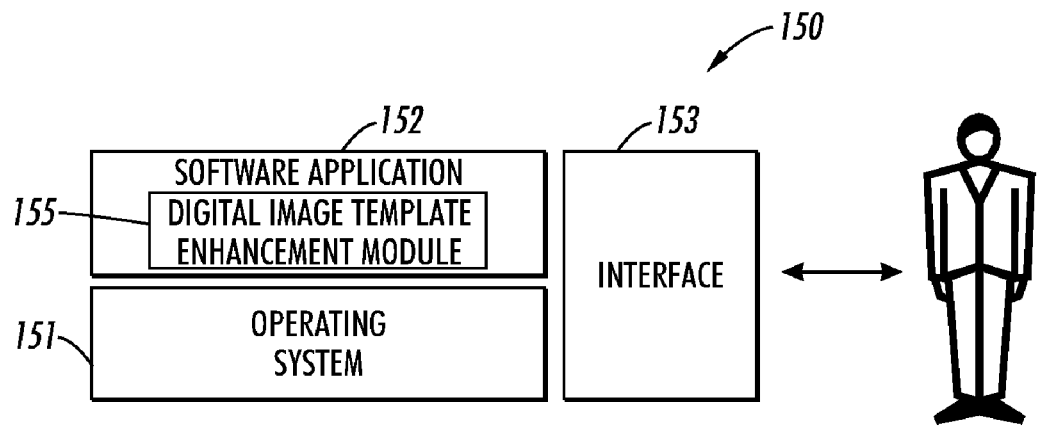
FIG. 2 illustrates a schematic view of a software system including an operating system, application software, and a user interface for carrying out the present invention.
Figure 3:
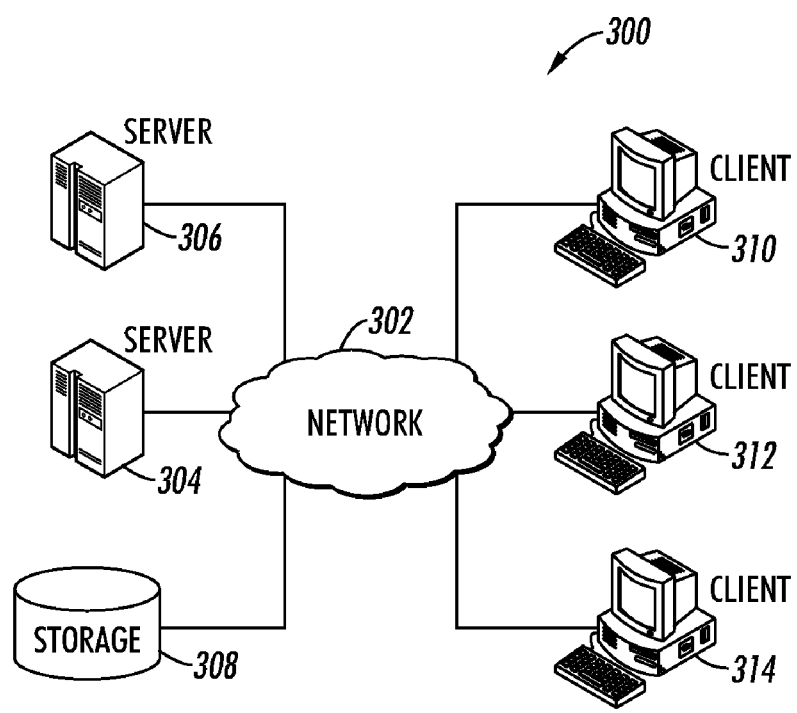
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates that the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

FIG. 2 illustrates a computer software system 150 provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153 is preferably a graphical user interface (GUI). In one potential embodiment, operating system 151 and interface 153 can be implemented in the context of a "Windows" system. The digital photo product template enhancement module 155 can be configured to include instructions, such as the various operations described herein with respect to the various components and modules described herein such as, for example, the method 500 depicted in FIG. 5.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers, which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
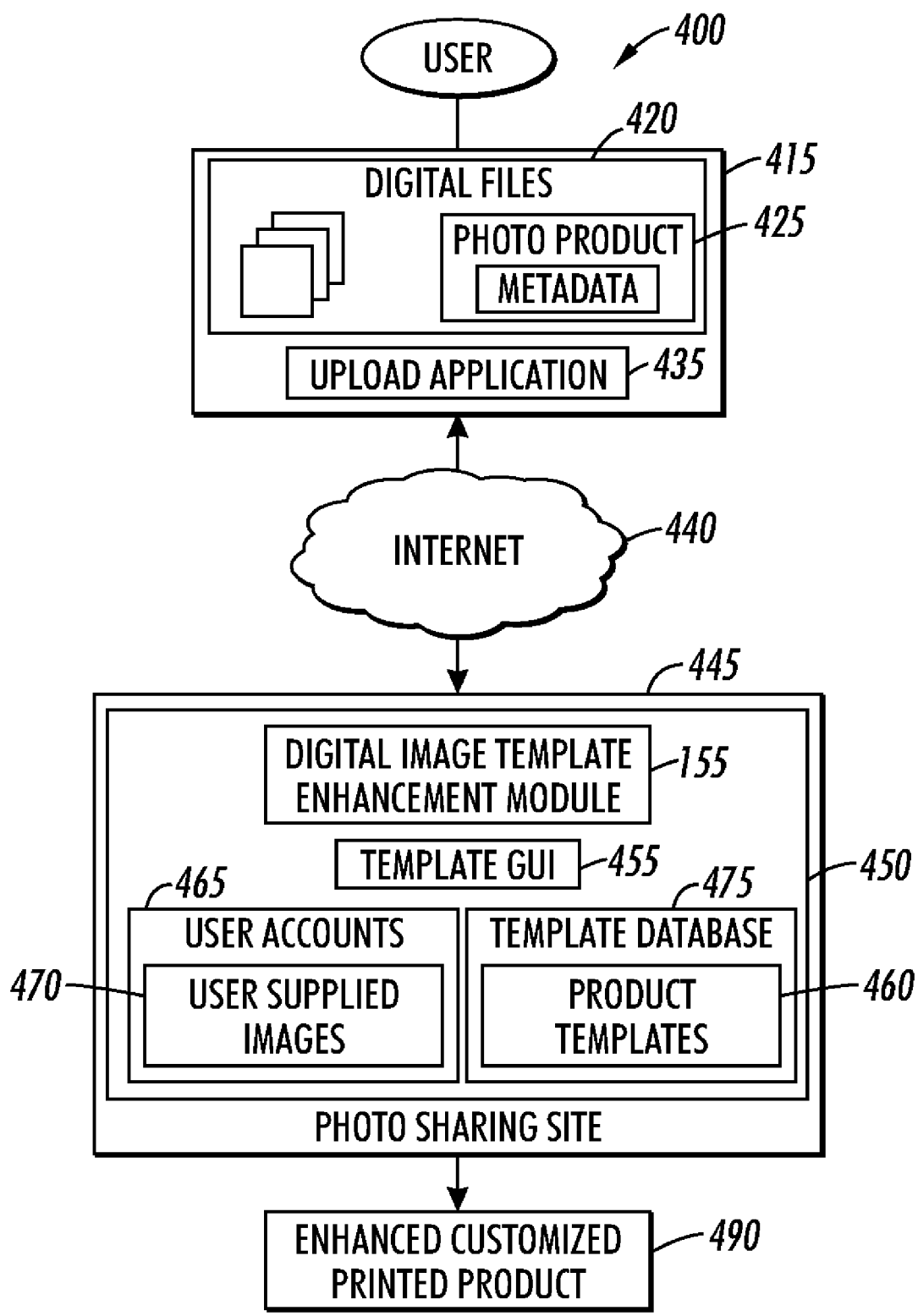
FIG. 4 illustrates a block diagram of a photo kiosk system, which can be utilized for processing digital photo product templates in order to enhance a personalized photo product and to enable greater flexibility, in accordance with a preferred embodiment.

FIG. 4 illustrates a block diagram of a photo kiosk system 400, which can be utilized for processing digital photo product templates 460 in order to enhance a personalized photo product 425 and to enable greater flexibility, in accordance with a preferred embodiment. The photo kiosk system 400 can include a variety of photo product templates 460 with a placeholder for customer-supplied images 470. The photo kiosk system 400 can automatically store and organize the digital files 420 from the user in accordance with a preferred embodiment of the present invention. The photo kiosk system 400 includes one or more computers 415 that access a photo sharing site 445 over a network, such as the Internet 440. Once connected to the Internet 440, the computer 415 can upload digital files 420 to the photo sharing site 445 for storage and display.

A computer 415 refers to an electronic device capable of storing digital files 420 and communicating over a network 440, such as PCs. In a preferred embodiment, the computer 415 is browser-based, although non-browser-based computers 415 may also be utilized. Whether browser-based or not, the computer 415 may be supported by a specialized application such as upload application 435 that operates in accordance with present invention for uploading digital images such as photo product 425. The computer 415 may also refer to any electronic device capable of storing digital images and/or video, such as photo kiosks, web-enabled digital cameras, PDAs, and cellular telephones, for example.

In a preferred embodiment, the type of digital files 420 that are uploaded to the site 445 are predominately digital images such as photo product 425, but also include video clips, and audio. The digital files 420 may be inputted into the computer 415 from a variety of sources (not shown), such as a digital camera, CD, DVD, or a scanner, for instance. The files 420 may be stored on a storage device (not shown), such as a hard drive, CDR, DVDR, or an imaging device attached to the computer 415. In a preferred embodiment, some or all of the digital files 420, particularly images 425, can have metadata associated with them that describes and/or categorizes the file. The metadata can be included within the files 420, or be stored in a separate file. The Exchangeable Image File Format for Digital Still Camera (EXIF) is an example of an international digital still camera image file format standard that supports attachment of tags to image files. Other types of digital files 420 may also include metadata, such as HTML and XML documents, for example.

The photo sharing site 445 comprises at least one server 450 that includes a digital photo product template enhancement application 155, a template GUI 455, a user accounts and preferences database 465 and a template database 475. The digital photo product template enhancement application 155 is a controlling software program running on a computer that generates a customized print ready file 490. Operator selection and interaction at a template graphical user interface 455 (for example, a touch screen monitor) allows a customer to select a specific design from displayed previews and screen prompts. Application 155 associates each distinctive design for customized print ready file 490 with the photo product template 460. One or more photo product templates 460 can be stored in a templates database 475 that is accessed by the application 155.

Templates database 475 can be implemented utilizing a database product (such as ORACLE Database software from Oracle Corporation, Redwood Shores, Calif.) or can simply be implemented as part of a structured file system where directories contain multiple photo product template 460 files. The templates 460 can be defined as a series of objects some of which can be colorized (e.g., by a user). Such objects may be vector elements or grayscale images that can be colorized in a manner analogous to how page layout apps colorize monochrome TIFF images. Color sets that can be applied to the template 460 can be displayed on the template GUI 455 based on an available set of color sets predefined by a print shop and the user defined "seed color" which can then be utilized to find additional colors. The color sets can be ranked and complementary color set suggestions can be provided based on the evaluation of the colors in the photo product 425. Similarly, the color set associated with the photo product template 460 can be rotated and the colors in the color set can also be collapsed.

Figure 5:
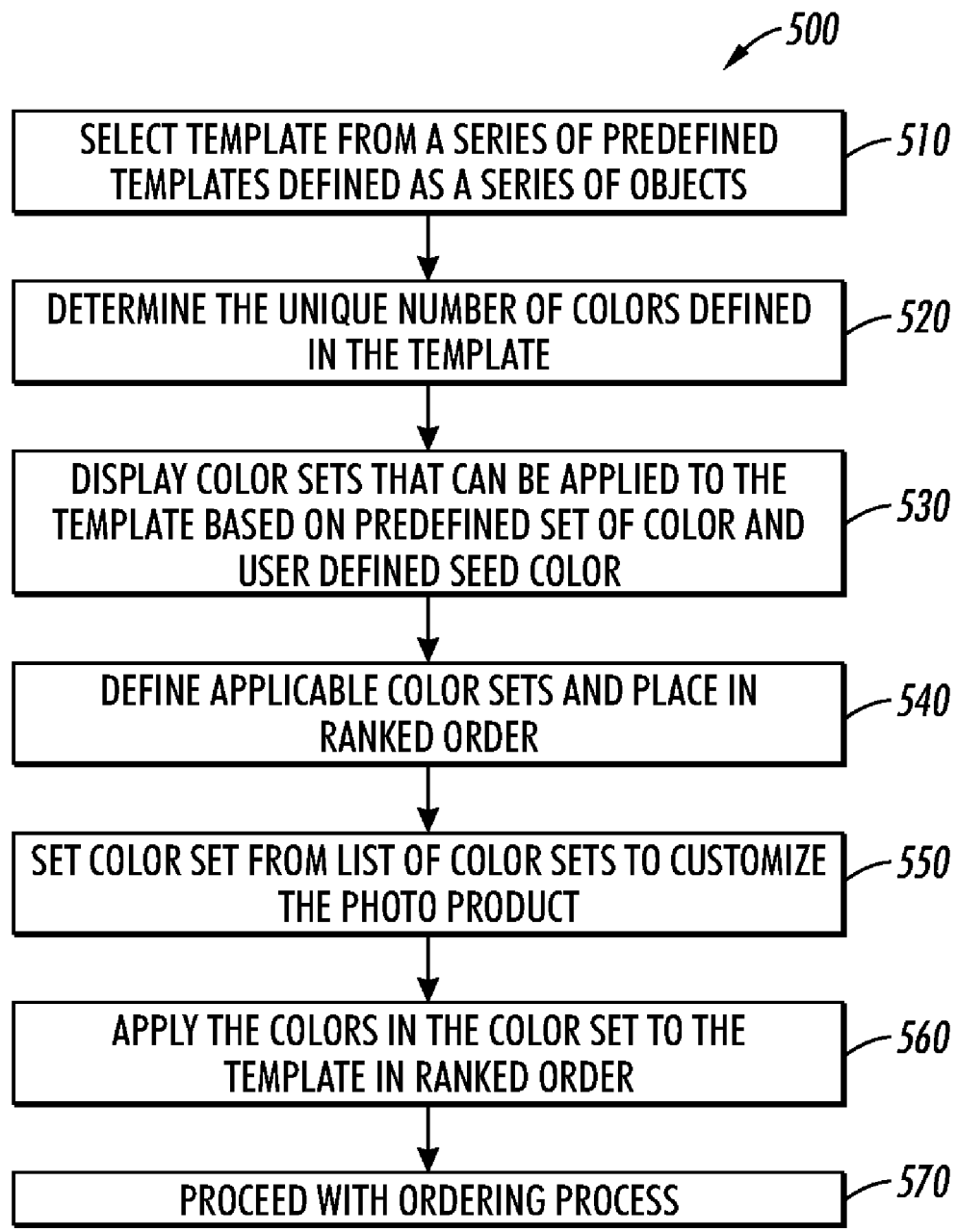
FIG. 5 illustrates a detailed flow chart of operations illustrating logical operational steps of a method for processing digital photo product templates, in accordance with a preferred embodiment.

FIG. 5 illustrates a detailed flow chart of operations illustrating logical operational steps of a method 500 for processing digital photo product templates 460, in accordance with a preferred embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 for processing digital photo product templates 460 in order to enhance a personalized photo product 425 and to enable greater flexibility when selecting options for the photo product template 460 described herein can be deployed as process software in the context of a computer system or data-processing system as that depicted in FIGS. 1-3.

Initially, the photo product template 460 can be selected from a series of predefined templates from the photo product templates database 475 associated with the kiosk system 400, as depicted at block 510. Once the user selects one of these templates, the system 400 can determine the unique number of colors defined in the template, as illustrated at block 520. The color sets that can be applied to the template 460 can be displayed based on a predefined set of colors and a user defined seed color, as depicted at block 530. For example, the print shop may define an available set of color sets. Similarly, the user may be prompted for a "seed color" which can then be utilized to find additional colors.

The applicable color sets can be defined and can be placed in a ranked order, as depicted at block 540. In some embodiments, a number of color sets based on an initial color can be specified by a user. An algorithm for prompting the "seed color" can be utilized to find additional colors and many shareware programs can be utilized to recommend color sets based on an initial color specified by the user. The kiosk system 400, for example, can recommend color sets. Such an approach can reduce the number of discrete designs that need to be maintained while offering greater color choices.

Note that in some embodiments, a graphically displayed color wheel may be provided via a GUI, wherein the color wheel is capable of supporting both scientific (additive/RGB) and artistic (subtractive/RYB) color systems. Color schemes can be saved and exported to various formats for use in other applications. Such an application may be implemented in the context of a program that supports both the artistic and scientific color systems using analogous, complementary, split complementary, monochromatic, tetradic and triadic schemes. Color information can be entered and retrieved utilizing RGB, CMYK, HSB, Lab and Websafe RGB. Colors can also be sampled on-screen and applied to such a color wheel.

The system 400 described herein is capable of evaluating the image(s) in the template 460 to determine seeds for color set definition. For example, the system 400 can prompt the user to click on the color of interest in the image 125. The system 400 can utilize the most dominant color in the image 125. Also, the system 400 can determine the two or three most dominant colors in the image 125 and provide a color set for each color. The system 400 can also utilize content detection algorithms to detect objects of interest and then utilize the dominant colors of one or more of those objects to create color set options for the user. Some potential objects of interest include clothing, eyes, hair, flowers, etc. Similarly, the colors within the set can be defined in a ranked order. The ranked order is typically done utilizing an algorithm that evaluates relative placement in the color wheel.

A color set can be selected from the list of color sets in order to customize the photo product 425, as illustrated at block 550. When the user selects a color set, the colors in that color set can be automatically applied to the template 460 utilizing the predefined rank. The system 400 can also provide the user a control to "rotate" the colors in the color set. This control can override the ranking of the colors in the color set by taking the top-ranked color and making it the lowest ranked color. The colors can then be applied to the template 460 utilizing the new ranks. The system 400 can also provide an option to "collapse" the number of colors in the set. In this case the system 400 can create a smaller color set utilizing the same seed.

A suitable color set can be selected from a list of applicable color sets for the template 460 that can be utilized to customize the photo product 425 and the colors in the color set can be automatically applied to the template 460 in the predefined ranked order, as shown at block 560. Based on the ranks, the colors can be applied to the photo product template 460. The ordering process can proceed once the user selects and customizes the color set to his or her liking, in order to generate a customized print ready file 490, as depicted at block 570.

The photo product templates 460 utilize ranked placeholders for colors in the color set derived from a user-selected seed with these templates. Similarly, complementary color set suggestions can also be provided based on the evaluation of the colors in the image 425. The colors can be associated in a color set to a matching template utilizing rules. Such an approach reduces the number of discrete designs that must be maintained while offering greater color choices. The system 400 also enables print providers to provide a virtually infinite number of templates in a manner that's actually simpler than current best practices. Similarly, utilizing rules-based association between color sets and templates eliminates a lot of work involved in providing variations of a template. Such an approach simplifies photo product ordering (via kiosk or web interface) by eliminating duplication and provides more flexibility for print shop customers to customize photo products to their liking while providing real time design assistance.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for processing photo product templates, said method comprising:
    selecting at least one photo product template from at least one predefined template, wherein said at least one photo product template comprises a plurality of objects, at least some of which are capable of being colorized;
    displaying at least one color set to be applied to said at least one photo product template based on a predefined set of colors and a pre-defined seed color;
    customizing at least one photo product by automatically applying a plurality of colors associated with said at least one color set to said at least one photo product template utilizing a predefined color rank, thereby providing real time design assistance in the processing of photo product templates.

2. The method of claim 1 further comprising defining said predefined color rank for said plurality of colors associated with said at least one color set utilizing an algorithm that evaluates a combination of primary and auxiliary colors in a color set relative to other color sets.

3. The method of claim 1 further comprising defining said predefined color rank for said plurality of colors associated with said at least one color set utilizing an algorithm that evaluates relative placement in a color wheel.

4. The method of claim 1 wherein displaying said at least one color set to be applied to said at least one photo product template, further comprising:
    evaluating at least one image in said at least one photo product template in order to identify said seed color for defining said at least one color set.

5. The method of claim 4 wherein evaluating said at least one image in said at least one photo product template in order to identify said seed color, further comprising:
    prompting a user to select a color of interest in said at least one image.

6. The method of claim 4 wherein evaluating said at least one image in said at least one photo product template in order to identify said seed color, further comprises:
    utilizing at least one dominant color in said at least one image.

7. The method of claim 4 wherein evaluating said at least one image in said at least one photo product template in order to identify said seed color, further comprises:
    utilizing a content detection algorithm to detect at least one object of interest; and
    thereafter utilizing at least one dominant color associated with said at least one object of interest to create said at least one color set.

8. The method of claim 1 further comprising:
    selecting a different color set among said at least one color set that has a consistent relationship among primary colors and auxiliary colors in order to thereafter collapse said plurality of colors in said at least one color set in order to create a smaller color set.

9. The method of claim 1 further comprising:
    rotating said plurality of colors in said at least one color set in order to override said ranking of said plurality of colors in said at least one color set by altering a top-ranked color into a lowest ranked color; and
    collapsing said plurality of colors in said at least one color set in order to create a smaller color set utilizing a same color seed.

10. The method of claim 1 further comprising:
providing at least one complementary color set suggestion based on an evaluation of said plurality of colors.

11. A method for processing photo product templates, said method comprising:
selecting at least one photo product template from at least one predefined template, wherein said at least one photo product template comprises a plurality of objects, at least some of which are capable of being colorized;
displaying at least one color set to be applied to said at least one photo product template based on a predefined set of colors and a pre-defined seed color;
customizing at least one photo product by automatically applying a plurality of colors associated with said at least one color set to said at least one photo product template utilizing a predefined color rank, thereby providing real time design assistance in the processing of photo product templates; and
defining said predefined color rank for said plurality of colors associated with said at least one color set utilizing an algorithm that evaluates a combination of primary and auxiliary colors in a color set relative to other color sets.

12. A system for processing photo product templates, said system comprising:
a processor;
a data bus coupled to said processor; and
a computer-usable medium embodying computer code, said computer-usable medium being coupled to said data bus, said computer program code comprising instructions executable by said processor and configured for:
selecting at least one photo product template from at least one predefined template, wherein said at least one photo product template comprises a plurality of objects, at least some of which are capable of being colorized;
displaying at least one color set to be applied to said at least one photo product template based on a predefined set of colors and a pre-defined seed color; and
customizing at least one photo product by automatically applying a plurality of colors associated with said at least one color set to said at least one photo product template utilizing a predefined color rank, thereby providing real time design assistance in the processing of photo product templates.

13. The system of claim 12 wherein said instructions are further configured for defining said predefined color rank for said plurality of colors associated with said at least one color set utilizing an algorithm that evaluates a combination of primary and auxiliary colors in a color set relative to other color sets.

14. The system of claim 12 wherein said instructions are further configured for defining said predefined color rank for said plurality of colors associated with said at least one color set utilizing an algorithm that evaluates relative placement in a color wheel.

15. The system of claim 14 wherein evaluating said at least one image in said at least one photo product template in order to identify said seed color, further comprising:
prompting a user to select a color of interest in said at least one image.

16. The system of claim 14 wherein evaluating said at least one image in said at least one photo product template in order to identify said seed color, further comprises:
utilizing at least one dominant color in said at least one image.

17. The system of claim 14 wherein evaluating said at least one image in said at least one photo product template in order to identify said seed color, further comprises:
utilizing a content detection algorithm to detect at least one object of interest; and
thereafter utilizing at least one dominant color associated with said at least one object of interest to create said at least one color set.

18. The system of claim 12 wherein displaying said at least one color set to be applied to said at least one photo product template, further comprising:
evaluating at least one image in said at least one photo product template in order to identify said seed color for defining said at least one color set.

19. The system of claim 12 wherein said instructions are further configured for selecting a different color set among said at least one color set that has a consistent relationship among primary colors and auxiliary colors in order to thereafter collapse said plurality of colors in said at least one color set in order to create a smaller color set.

20. The system of claim 12 wherein said instructions are further configured for providing at least one complementary color set suggestion based on an evaluation of said plurality of colors.

* * * * *